(12) United States Patent
Chronister

(10) Patent No.: US 7,121,505 B2
(45) Date of Patent: Oct. 17, 2006

(54) METHOD OF CONTROL FOR TOY AIRCRAFT

(76) Inventor: Nathan Jeffrey Chronister, 582 Laurelton Rd., Rochester, NY (US) 14609

( * ) Notice: Subject to any disclaimer, the term of this patent is extended or adjusted under 35 U.S.C. 154(b) by 0 days.

(21) Appl. No.: 11/039,414

(22) Filed: Jan. 20, 2005

(65) Prior Publication Data

US 2006/0032975 A1    Feb. 16, 2006

Related U.S. Application Data

(60) Provisional application No. 60/537,330, filed on Jan. 20, 2004.

(51) Int. Cl.
    *B64C 17/00* (2006.01)
(52) U.S. Cl. ............... 244/75.1; 244/76 A; 244/65; 244/72; 446/57; 416/43
(58) Field of Classification Search ............... 244/51, 244/65, 66, 72, 22, 26, 30; 416/240, 43, 416/120, 195, 163; 446/57
    See application file for complete search history.

(56) References Cited

U.S. PATENT DOCUMENTS

| | | | | |
|---|---|---|---|---|
| 1,394,816 A | * | 10/1921 | Engler | 244/22 |
| 1,411,644 A | * | 4/1922 | Schmidt | 416/195 |
| 1,443,013 A | * | 1/1923 | Dougall | 416/211 |
| 1,879,345 A | * | 9/1932 | Lawrence | 244/26 |
| 1,963,531 A | * | 6/1934 | Roberts | 416/163 |
| 2,445,446 A | * | 7/1948 | Mas | 416/120 |
| 4,204,656 A | * | 5/1980 | Seward, III | 244/30 |
| 4,693,671 A | * | 9/1987 | Thornton et al. | 416/43 |
| 6,565,039 B1 | * | 5/2003 | Smith | 244/72 |
| 6,609,945 B1 | * | 8/2003 | Jimenez et al. | 446/454 |

* cited by examiner

*Primary Examiner*—Galen Barefoot

(57) ABSTRACT

The invention described here offers a low-cost method of remote flight control suitable for use in toy airplanes and ornithopters (flapping-wing aircraft). To accomplish this, the aircraft is powered by a reversible electric motor. The propeller or flapping wing produces a torque force, which is dependent upon the direction of motor rotation. This torque force is used to bank the aircraft and cause a turn. In the case of an airplane, a reversible-pitch propeller enables the propeller to produce thrust in either rotational direction. In the case of an ornithopter, the torque force results from an asymmetrical motion of the wings. By reversing the motor direction, the asymmetry is reversed and the ornithopter turns in the opposite direction. This control method reduces costs, because unlike other toy aircraft control systems, it provides full directional control of the aircraft without the need for any servo or actuator in addition to the drive motor.

6 Claims, 6 Drawing Sheets

US 7,121,505 B2

METHOD OF CONTROL FOR TOY AIRCRAFT

CROSS-REFERENCE TO RELATED APPLICATIONS

This application claims the benefit of Provisional Patent Application Ser. No. 60/537,330, filed Jan. 20th, 2004 by the present inventor.

STATEMENT REGARDING FEDERALLY SPONSORED RESEARCH OR DEVELOPMENT

Not Applicable.

Reference to Sequence Listing, a Table, or a Computer Program Listing Compact Disc Appendix Not Applicable.

BACKGROUND OF THE INVENTION

1. Field of Invention

This invention pertains to the field of aeronautics and describes a method of aircraft control for pilotless aircraft (Class 244, Subclass 190). The invention is a method of control that is applicable to fixed-wing airplanes, as well as to ornithopter type aircraft (those propelled by flapping wings).

2. Prior Art

Recently, by avoiding the use of expensive hobby servos, toy manufacturers have been able to produce radio-controlled airplanes inexpensively. One cost-saving approach is a twin motor design, marketed by Planrite Trading Company Ltd., 1105 8th Street East, Saskatoon, Saskatchewan, S7H 0S3, Canada, under the name "Sky Buddy", in which directional control is achieved by varying the power to the left and right motors. Another technique is the use of simple magnetic actuators, rather than servos, to move control surfaces. This method has been used by Estes-Cox Corporation, 1295 H Street, Penrose, CO 81240 in their "Sky Rangers" toy planes. Both methods reduce the complexity and cost compared with hobby servo control systems. However, both methods do require additional control components (a second motor and associated control circuit, or the magnetic actuator).

Jasman Toys, 445 Marine View Ave., Suite 295, Del Mar, Calif. 92014, is producing a toy airplane called the "VrRoom Zoom" with no additional actuator. The control system consists of a radio receiver, an on/off motor control, and an electric motor, which propels the aircraft. The torque force produced by the motor causes the plane to fly in a circle when the motor is on. The plane flies straight when the motor is off. Thereby, some degree of flight control is possible. This system has the desired level of simplicity, but it provides severely limited control.

For flapping wing aircraft, called ornithopters, none of the prior art control methods is suitable for an inexpensive toy. The twin motor approach is not applicable to ornithopters, and magnetic actuators do not exert enough force to be very effective in flapping flight. The on/off motor control system used by Jasman would not work well in an ornithopter, because ornithopters generally do not glide well. Therefore, remotely controlled ornithopters still rely on control surfaces moved by servos. They presently cost about ten times more than the least expensive remotely controlled airplanes.

U.S. Pat. No. 6,550,716 assigned to Neuros Co., Ltd, describes the control system commonly used in current radio controlled ornithopters. U.S. Patent Application #20020173217 by Andrew Sean Kinkade describes a similar system. In each case, the aircraft has a tail controlled by two servos. The radio receiver on board the ornithopter controls the two servos and an electronic speed control, which determines the speed of wing flapping. This system provides an effective means of flight control but it is too expensive to be used in a mass-market toy.

Ornithopter wing flapping mechanisms are normally designed to flap the wings symmetrically. It is considered undesirable to have an imbalance of the right and left wings, which would interfere with the action of the tail or other control surfaces. For example, Eric Edward Tomas (U.S. Pat. No. 6,544,092) and Desmond Leigh-Hunt (U.S. Pat. No. 4,155,195) used a double crank to flap the wings in a symmetrical fashion. However, some degree of asymmetry is often allowed, simply because eliminating it would require a more complex mechanism. U.S. Pat. No. 2,859,553 (P. H. Spencer), 3,626,555 (P. Albertini et al.), and US. Pat. No. 6,632,119 (Chernek, et al) show mechanisms that allow a degree of asymmetry. In these cases, however, the asymmetric flapping of the wings does not serve any purpose.

BRIEF SUMMARY OF THE INVENTION

The claimed invention is an aircraft control method in which the torque force produced by the propeller or flapping wings is used to provide directional control. A remote control system with a forward and reverse motor controller drives an electric motor, which turns the propeller or flaps the wings. In the case of a propeller-driver aircraft, a reversible-pitch propeller is required, so that the propeller can produce thrust regardless of the direction in which it rotates. The propeller-driven aircraft may be an airplane with fixed wings, or it may be another propeller-driven aircraft such as an autogyro or blimp. In the case of an ornithopter, the wing-flapping mechanism is designed to produce an asymmetrical flapping motion, which causes the ornithopter to turn. By reversing the motor rotation, the asymmetry of the flapping motion is also reversed, causing a turn in the opposite direction. This system is a simpler, lighter, and less expensive alternative to using servos, twin motors, or other actuator types for directional control.

DETAILED DESCRIPTION OF THE INVENTION

Preferred Embodiment

Figure 1:
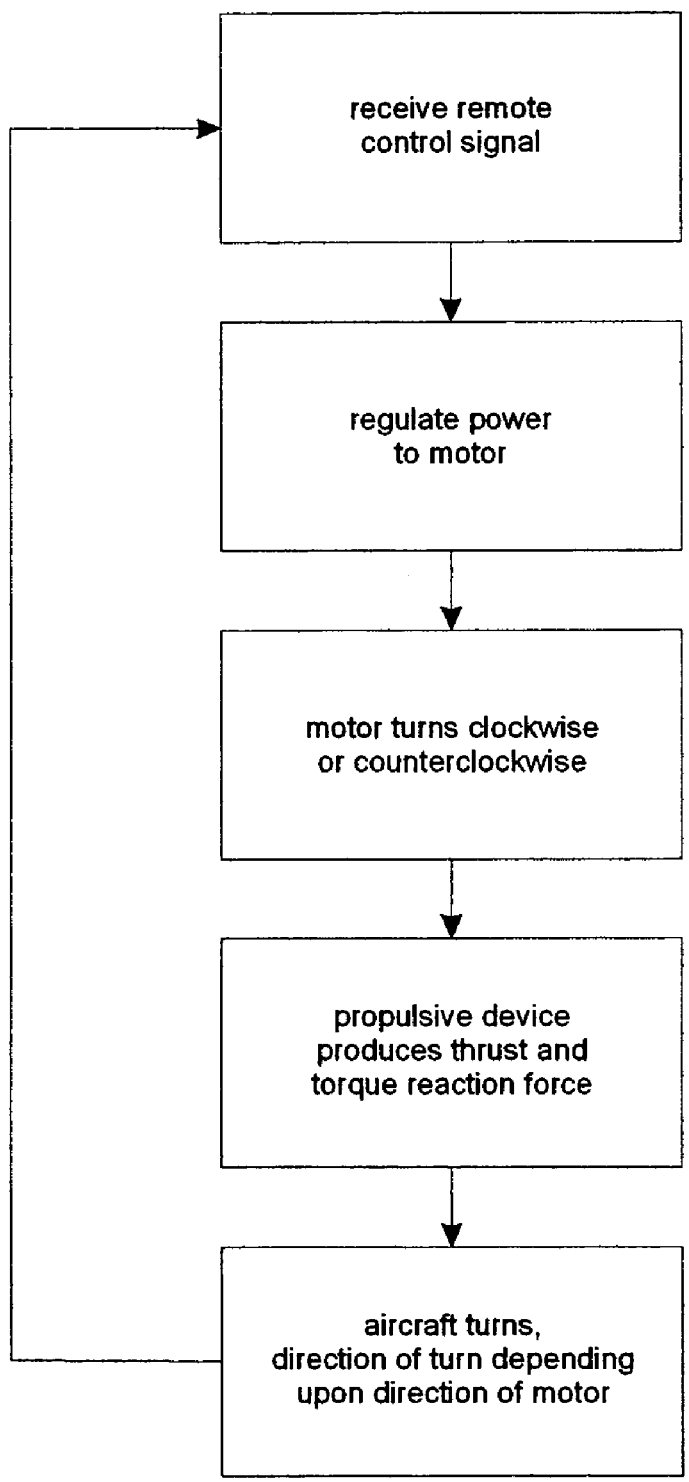
FIG. 1. Flow chart depicting method of flight control.

The present invention is an improved method of flight control, applicable to toy aircraft. FIG. 1 shows a flowchart of the operation of the new method of flight control. First, the system receives a remote control signal from an external control device, typical of those used in the industry. The signal may be carried by infrared, radio, or other means. The receiver drives a motor control circuit, which regulates power to the drive motor. The motor control circuit provides a direct current to the motor, and the polarity of that current may be reversed in order to control the direction of rotation of the motor. The motor is combined with a unique reversible-pitch propeller or moveable wings configured to provide a propulsive force, regardless of which direction the motor rotates. However, the propulsive device also imparts a steering force or torque reaction to the aircraft body. The direction of the steering force is determined by the motor direction. Therefore the aircraft can be steered simply by changing the direction of the drive motor.

Figure 2:
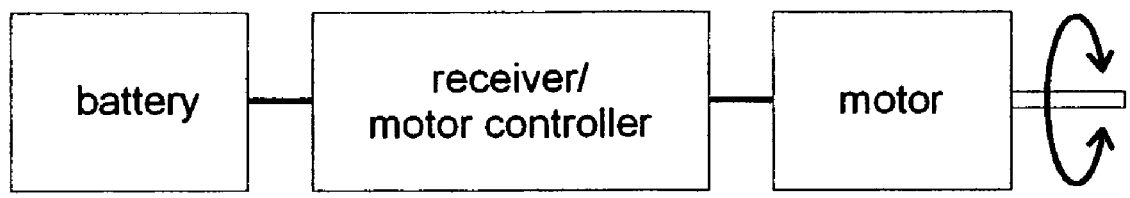
FIG. 2. System components, preferred embodiment.
Figure 3:
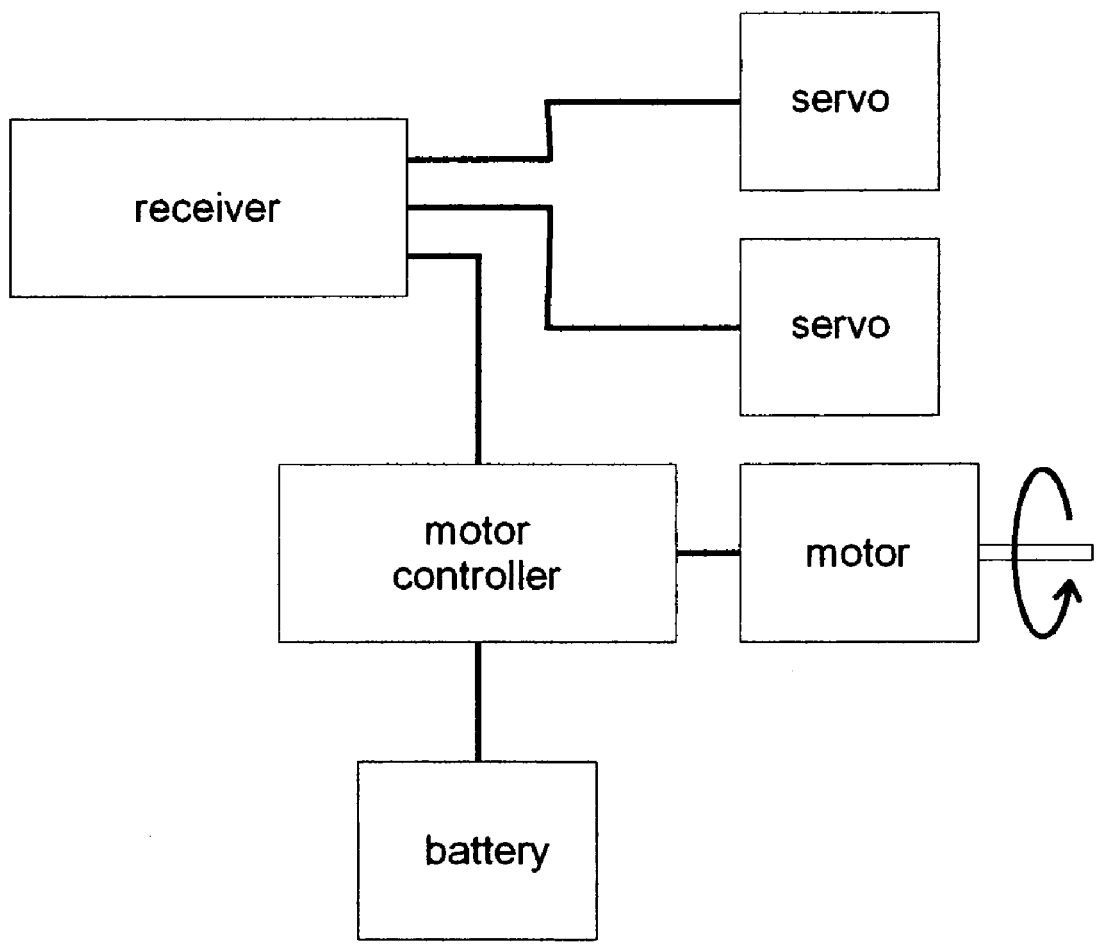
FIG. 3. Prior art system components.

The operation of this system differs from prior control systems in that it does not rely on servos or control surfaces to steer the aircraft. FIG. 2 shows the control system components in the preferred embodiment. The receiver and motor control circuit may be combined in a single unit, as shown, or may be separate. FIG. 3 (prior art) shows the main control system components in a conventional remotely piloted aircraft. Typical aircraft remote control systems include a radio receiver, an electric motor, an electronic speed control for the motor, and two servos. The servos control the flight path by moving tail surfaces, such as an elevator and rudder. The control system components are all commercially available hobby items, but the total cost and complexity of the system prevent its use in a mass-market toy. The present invention offers a much simpler system. Eliminating complex servos and other expensive components makes possible a much lower production cost. Additionally, the simplicity of this system allows a much lower flying weight and smaller size, allowing the aircraft to be flown indoors, and taking advantage of recent popularity of micro-sized aircraft.

Construction of the receiver and speed control can be accomplished through standard electronics practices. Typically, the receiver and speed control will comprise suitable electronics components on a printed circuit board, or on a number of separate boards. The receiver may be of any type already used in remotely controlled aircraft. The motor control device may be any type of bidirectional motor control circuit, such as an H-bridge circuit. A pulse-width modulated output may be used, in order to vary the speed of the motor. Alternatively, a simple on/off motor control circuit may be used. Circuits of these types are common in various motor control applications, though they have not been used in combination with a reversible-pitch propeller to drive and steer an aircraft.

Normally, it is not desirable to reverse the direction of an airplane motor. Running a propeller in reverse causes the propeller thrust to be reversed. This would prevent the airplane from flying. However, by reversing the pitch angle of the propeller blades, it is possible to continue producing forward thrust. Then it becomes possible to use the torque reaction of the propeller to steer the aircraft either left or right. When the propeller rotates clockwise, as seen from behind, the aircraft will turn left. When the propeller rotates counterclockwise, as viewed from behind, the aircraft will turn right. The reversing of propeller pitch may be accomplished by a simple, passive mechanism.

Figure 4:
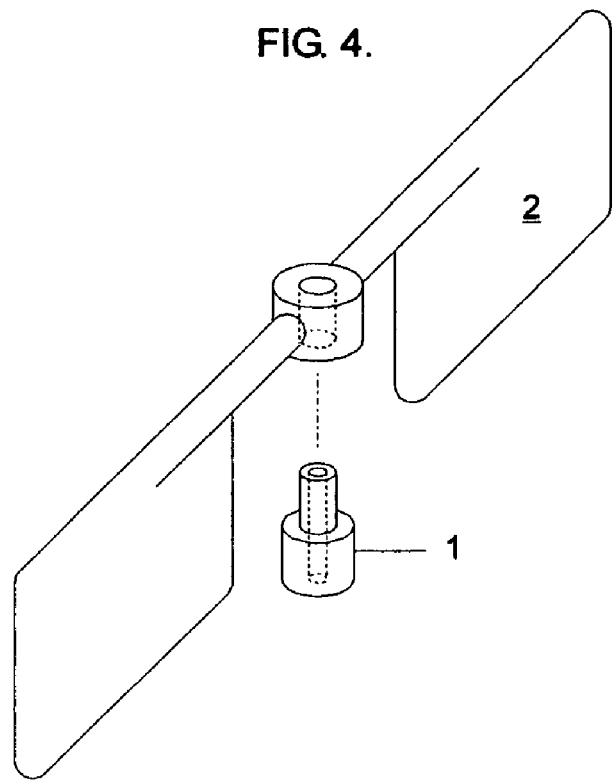
FIG. 4. Reversible-pitch propeller with flexible structure.

The preferred structure for a reversible-pitch propeller is shown in FIG. 4. Here, the propeller consists of a central hub (1) onto which is mounted a set of flexible propeller blades (2). The blades can made of a flexible material such as latex, synthetic rubber, plastic foam such as expanded polypropylene, or other flexible solid material. The front portion of each blade is made thicker or formulated from a stiffer material than the trailing portion. The propeller blade is aligned with the forward path of the aircraft when the motor is not running. Then, when the motor operates, the difference in flexibility of leading and trailing edges causes a torsion of each propeller blade, which causes it to align with the local airflow in a weathervane fashion. In this way, the propeller blades take on a pitch angle suitable for producing thrust. A more torsionally flexible blade will produce a propeller of low pitch, operating efficiently at high rotational speed relative to the forward speed of the aircraft. A less torsionally flexible blade will produce a propeller of high pitch, operating efficiently at low rotational speed relative to the forward speed of the aircraft. The momentum or centrifugal force of the propeller blades will help position the blades correctly. This allows a quite flexible structure which makes the propeller less likely to cause an injury.

DETAILED DESCRIPTION OF THE INVENTION

Alternative Embodiments

Figure 5:
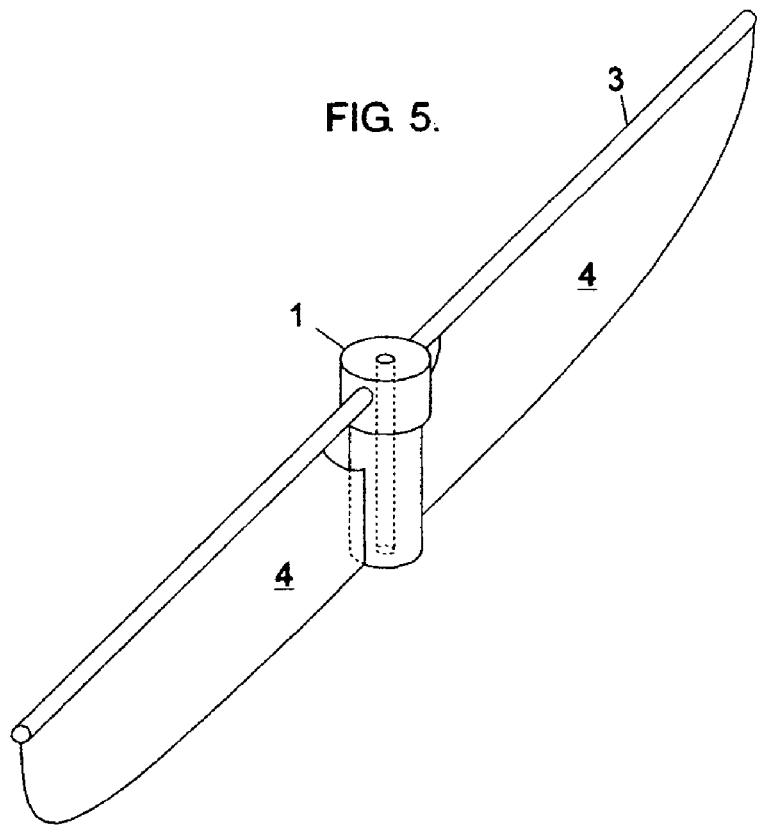
FIG. 5. Reversible-pitch propeller with alternative flexible structure.

Various other structures may be used to implement a reversible-pitch propeller. FIG. 5 shows a variation of the flexible propeller. Here, the central hub (1) supports a leading edge element (3) which forms the front edge of the propeller blades. The bulk of the propeller blade surface is made up of flexible material (4) which is attached to the central hub and leading edge element using glue, adhesive tape, sewing, or other fastening method. The flexible material may consist of a thin plastic sheet, latex, synthetic rubber, plastic foam, or other flexible material.

Figure 6:
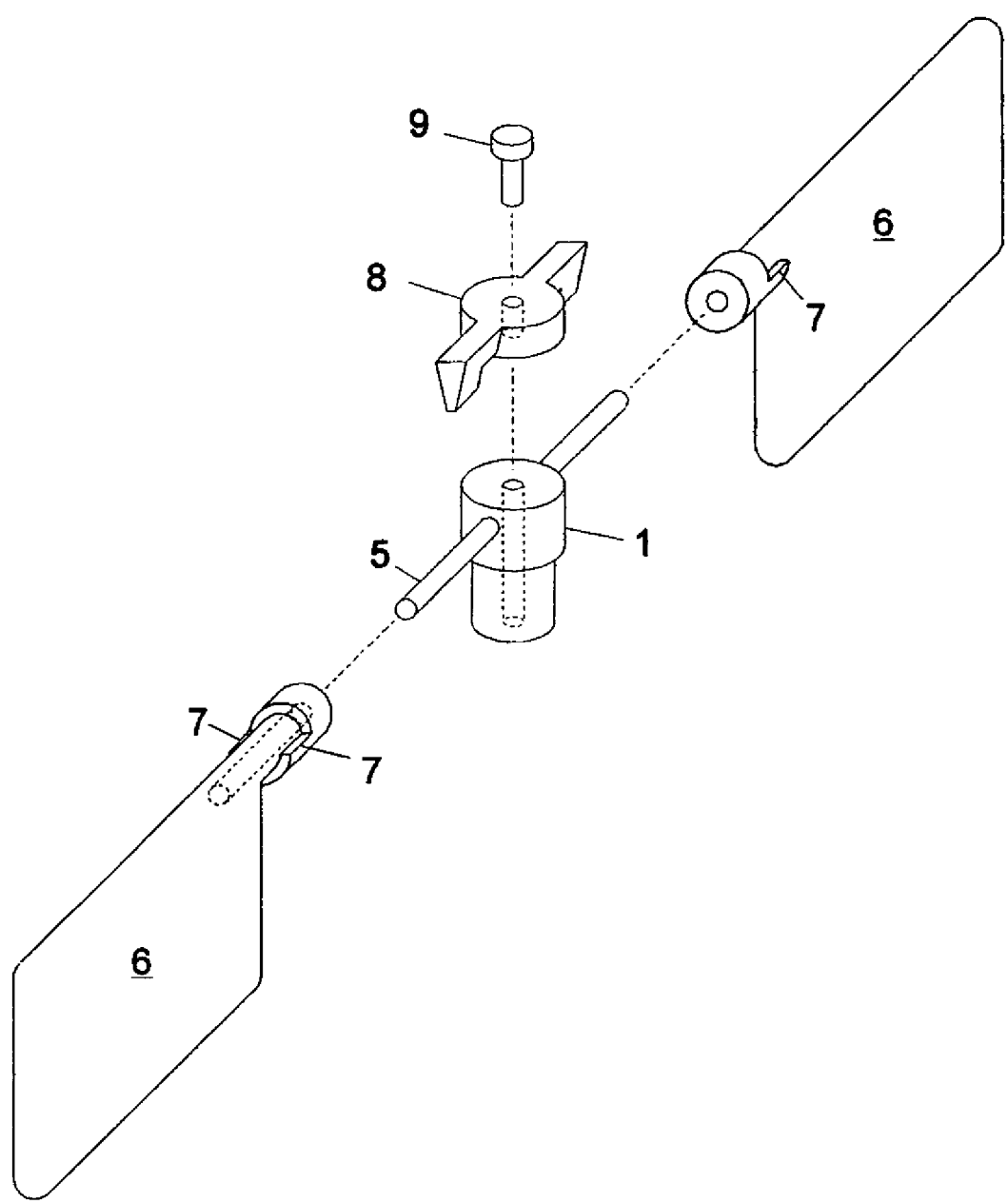
FIG. 6. Reversible-pitch propeller with hinged blades.

Another option is to use rigid, hinged propeller blades. FIG. 6 depicts an example of a hinged-blade propeller. The central hub (1) carries a hinge pin (5) onto which propeller blades (6) are mounted. Being hinged at the leading edge in the manner shown causes each blade to adjust its pitch, through a weathervane-type action. A limiting stop (7) may be used to restrain the hinged movement of the blades, holding them at the desired pitch angle during operation. An elastic element such as a rubber band or steel spring can also be used for this purpose. Additionally, steps should be taken to ensure that the blades cannot fly off of the propeller due to centrifugal force. This potential safety hazard can be overcome by using a clip (8) to secure each blade onto the central hub of the propeller. The clip could be made into the central hub, or created as a separate piece and attached using a fastener (9) or other means such as a suitable adhesive.

Another alternative embodiment is to apply the control system in a flapping wing aircraft, also known as an ornithopter. The flapping or moveable wings take the place of the rotating propeller. Normally, reversing the motor rotation in an ornithopter would have little or no affect. The wings typically have a stiff leading edge and flexible trailing edge, allowing them to take on the correct angle in both the up and down phase of their oscillating motion. Reversing the motor direction therefore will not reverse the thrust. Unlike the propeller, the flapping wing apparatus typically consists of paired left and right wings. Radio controlled ornithopters in the prior art are designed so that the wings flap symmetrically, with the left and right wings always synchronized. This results in a balanced flapping force, so that there is no torque reaction that would cause the ornithopter to turn left or right. The control method shown in FIG. 1 requires the use of a wing flapping mechanism that imparts an asymmetrical wing motion.

Figure 7:
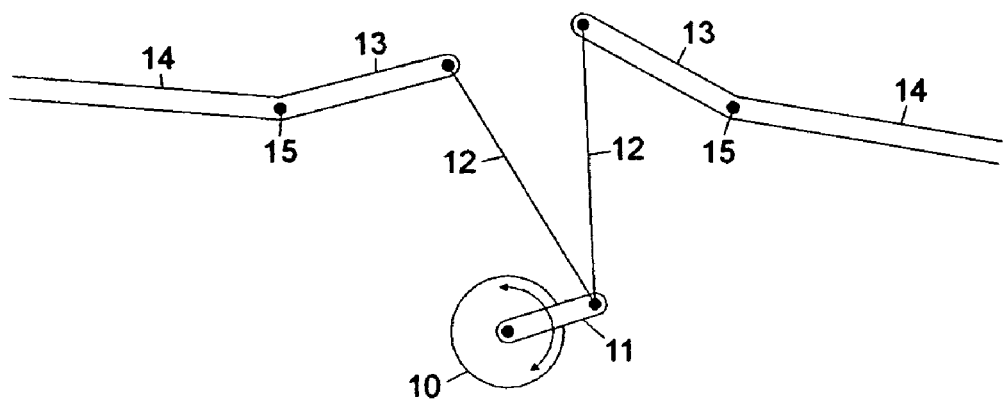
FIG. 7. Wing-flapping mechanism suitable for use in combination with the method of flight control described as the present invention.
Figure 8:
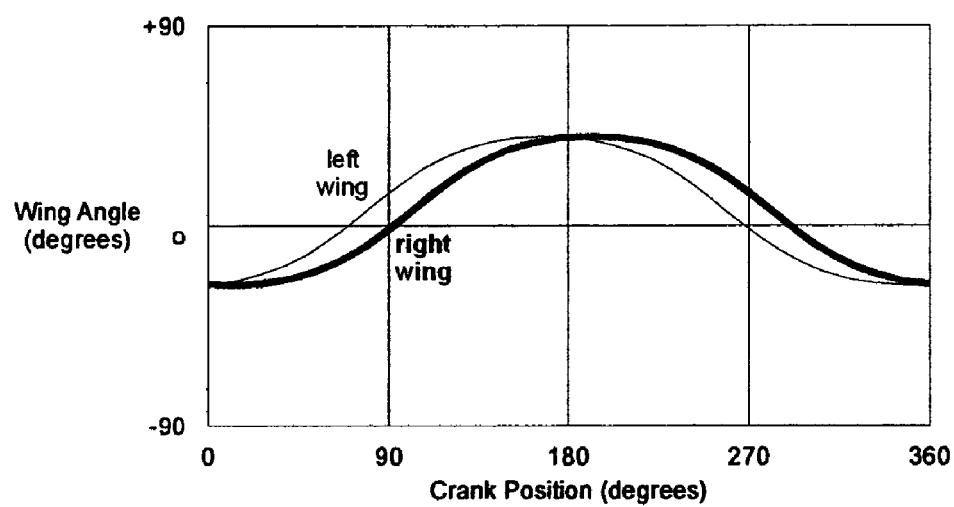
FIG. 8. Asymmetrical wing motion of the mechanism shown in FIG. 3. When the crank turns clockwise, the right wing travels ahead of the left wing. This causes a turn to the right.
Figure 9:
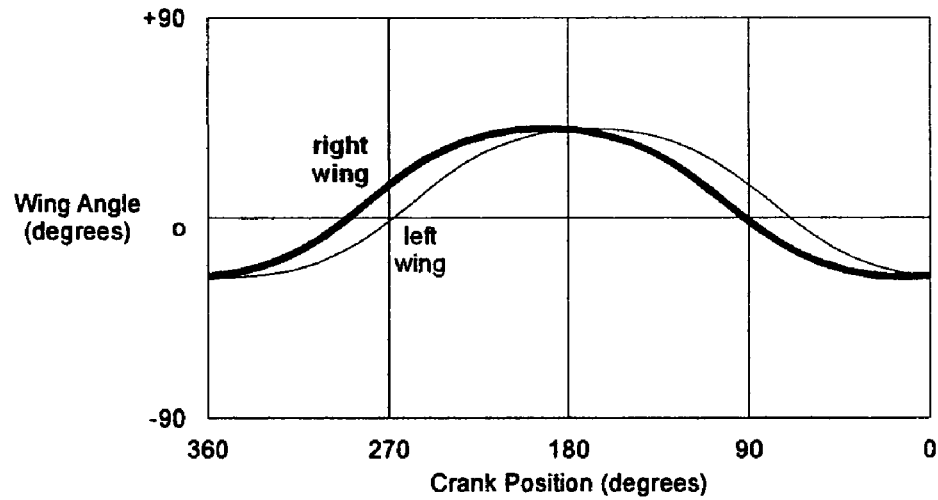
FIG. 9. When the crank turns counterclockwise, the left wing travels ahead of the right wing. This causes a turn to the left.

There are several simple methods for imparting an asymmetrical flapping motion. FIG. 7 illustrates one of the possible mechanisms suitable for use with the control system described here. In this mechanism, the motor (10) drives a crank (11). Connecting rods (12) cause an oscillating motion of the levers (13) which cause the wings (14) to rotate at hinge points (15) in an oscillating motion. FIGS. 8 and 9 show the wing motion produced by this mechanism, with angular wing position plotted as a function of the angular position of the crank. When the crank turns clockwise, as in FIG. 8, the right wing travels ahead of the left wing. This asymmetric wing motion causes a turn to the right. FIG. 9 shows the wing motion with opposite motor rotation. When the crank turns counterclockwise, the timing difference between the left and right wings is reversed. The left wing travels ahead of the right wing, causing a turn to the left.

The degree of asymmetry can be adjusted by varying the dimensions of the flapping mechanism. For example, shortening the levers while simultaneously reducing the crank radius will cause a more asymmetric motion for greater steering force. Increasing the angle of the bend between the levers and wings will cause a greater dihedral angle, which can improve stability and control response in the ornithopter.

Figure 10:
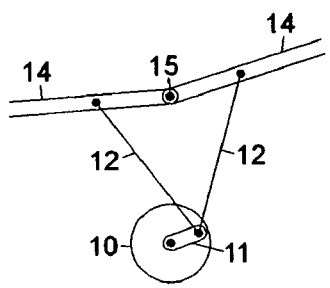
FIG. 10. Alternative flapping mechanism that produces asymmetrical wing motion.

FIGS. 10 through 13 show additional flapping mechanisms which may be used instead of the one shown in FIG. 7. In FIG. 10, the motor (10) drives a crank (11). The crank drives connecting rods (12) which directly flap the wings (14) attached at hinge point (15). This mechanism has fewer elements than the one of FIG. 7. It can be configured to produce a substantial timing difference between left and right wings.

Figure 11:
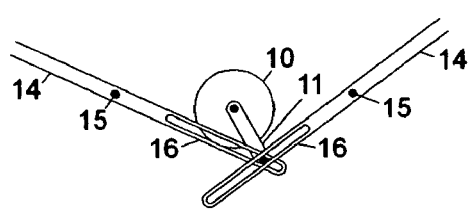
FIG. 11. Alternative flapping mechanism that produces asymmetrical wing motion.

In FIG. 11, the motor (10) turns crank (11) which causes an oscillating motion of the slotted levers (16). This in turn moves the wings (14) about hinge points (15). This mechanism produces a different type of asymmetric motion, compared with those discussed above. Instead of a timing difference between left and right wings, this mechanism causes the downstroke to be faster and more powerful on one side than the other. As with the previous mechanisms, this will cause a torque reaction capable of banking and steering the aircraft.

Figure 12:
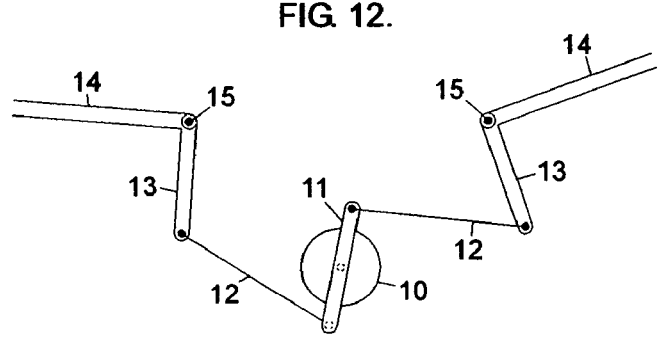
FIG. 12. Alternative flapping mechanism that produces asymmetrical wing motion.
Figure 13:
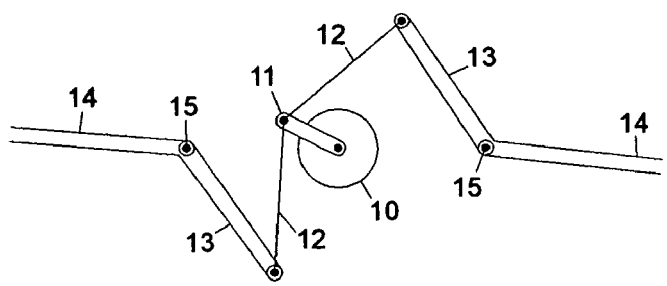
FIG. 13. Alternative flapping mechanism that produces asymmetrical wing motion.

FIGS. 12 and 13 show additional variations. In each case, the motor (10) drives a crank (11). Connecting rods (12) cause an oscillating motion of the levers (13) which flap the wings (14) mounted at hinge points (15). In FIG. 12, a double-throw crank or cam is used. The degree of asymmetry can be adjusted by raising or lowering the crank relative to the hinge points.

The flapping mechanism and wings may be constructed of any appropriate materials, such as those used in the prior art, and any mechanism that provides an asymmetric wing motion may be used. The number of wings may be two or more. Normally, a gearmotor, or geared reduction motor, is used to drive the flapping mechanism. However, other speed reducing means such as a belt or chain may be used. Also, some motor and wing combinations may not require any speed reduction.

I claim:

1. A method for controlling the direction of a remotely controlled aircraft, comprising the steps of:
   a. providing, in combination, a remote control receiver means and motor control circuit suitable for driving a motor in clockwise and counterclockwise directions
   b. providing a propulsive device, driven by said motor
   c. said propulsive device exerting a forward propulsive force, regardless of the direction of rotation of said motor
   c. said propulsive device exerting a torque reaction force, which imparts a rolling moment whose direction depends upon the direction of rotation of said motor
   d. reversing the direction of rotation of said motor as needed to control the flight path of said remotely controlled aircraft,
   whereby the flight direction of said remotely controlled aircraft is controlled by said torque reaction force, without use of control surfaces such as a rudder.

2. A remotely controlled airplane, wherein the improvement comprises, in combination:
   a. a motor control circuit suitable for driving an electric motor in clockwise and counterclockwise directions
   b. a propeller, having means for reversing the pitch of said propeller, depending upon the direction in which said propeller is rotating,
   whereby said propeller will exert a forward propulsive force, regardless of the direction of rotation of said motor, and
   whereby said propeller will exert a torque reaction force, which imparts a rolling moment whose direction is determined by the direction of rotation of said motor, and
   whereby the flight direction of said remotely controlled airplane may be controlled by said motor control circuit and torque reaction force without use of control surfaces such as a rudder.

3. The remotely controlled airplane of claim 2, wherein said motor is coupled to a torque amplification means such as a gearing system,
   whereby said torque reaction force is increased.

4. The remotely controlled airplane of claim 2, wherein said propeller comprises:
   a. a central hub
   b. a plurality of blades, hinged in a manner such that said blades take on a pitch suitable for producing said forward propulsive force regardless of the direction of rotation of said motor
   c. means for limiting the hinged movement of said blades,
   whereby the pitch of said propeller is reversed automatically through action of the airflow on said propeller.

5. The remotely controlled airplane of claim 2, wherein said propeller comprises:
   a. a central hub
   b. a plurality of blades, wherein said blades have a torsionally flexible construction, such that said blades take on a pitch suitable for producing said forward propulsive force regardless of the direction of rotation of said motor, whereby the pitch of said propeller is reversed automatically through action of the airflow on said propeller.

6. A remotely controlled ornithopter, or flapping-wing aircraft, wherein the improvement comprises, in combination:
   a. a motor control circuit suitable for driving an electric motor in clockwise and counterclockwise directions
   b. a mechanical means for converting the continuous rotation of said motor to an oscillating motion of the wings of said remotely controlled ornithopter, such that the left and right wings move asymmetrically with respect to each other, whereby said wings will exert a forward propulsive force, regardless of the direction of rotation of said motor, and whereby said wings will exert a steering force whose direction is determined by the direction of rotation of said motor, and whereby the flight direction of said remotely controlled ornithopter may be controlled by said motor control circuit, without use of control surfaces such as a rudder.

\* \* \* \* \*